J. E. ANDERSON.
LUBRICATOR FOR VEHICLE SPRINGS.
APPLICATION FILED MAR. 30, 1916.

1,224,257.

Patented May 1, 1917.

Inventor:
Jno. E. Anderson,
by W. J. Duvall,
Attorney.

UNITED STATES PATENT OFFICE.

JOHN EMIL ANDERSON, OF CHICAGO, ILLINOIS, ASSIGNOR OF ONE-HALF TO WENDELIN P. SENG, OF CHICAGO, ILLINOIS.

LUBRICATOR FOR VEHICLE-SPRINGS.

1,224,257. Specification of Letters Patent. Patented May 1, 1917.

Application filed March 30, 1916. Serial No. 87,837.

*To all whom it may concern:*

Be it known that I, JOHN E. ANDERSON, a citizen of the United States, residing at Chicago, in the county of Cook, and State of Illinois, have invented a new and useful Lubricator for Vehicle-Springs, of which the following is a specification.

My invention relates to a new and improved device designed to be applied to vehicle-springs, more especially to those employed in automobiles, for the purpose of conveniently and thoroughly lubricating between the leaves thereof.

The objects and advantages of the invention, together with the novel features thereof, will hereinafter appear and be particularly pointed out in the appended claims.

Referring to the drawing:

Fig. 3 are views in section and bottom plan respectively of a nut hereinafter referred to;

Similar numerals of reference indicate similar parts in all the figures of the drawing.

For the purpose of illustrating the applicability of my improved spring lubricator device or attachment, I have shown the same in connection with the usual form of channeled axle 1, the same having at suitable points widened portions 2, forming seats for the springs 3.

Figure 1:
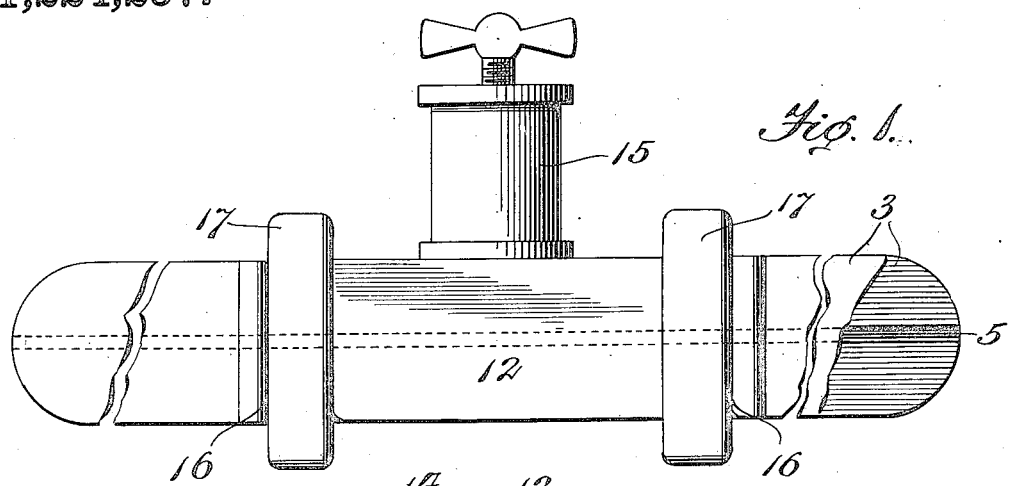
Figure 1 is a top plan view of a vehicle-spring employed in an automobile, with parts broken away, and provided with my improvement.
Figure 2:
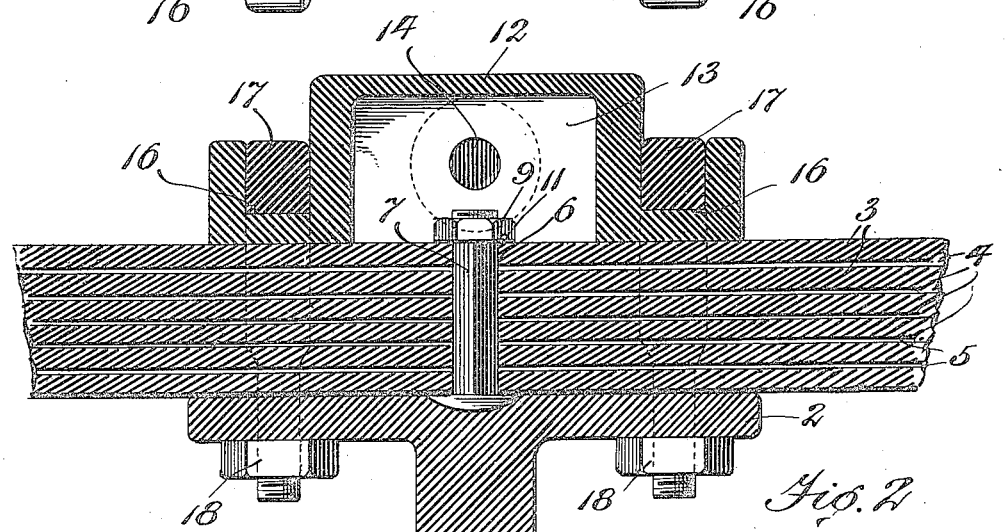
Fig. 2 is a vertical longitudinal sectional view of the same.

The upper side or surface of each of the leaves 4, composing the spring, with the exception of the uppermost leaf, may be provided with a longitudinally disposed shallow lubricating groove 5 (see Figs. 1 and 2).

The several leaves composing the spring are provided with coincident bolt-holes 6, as is usual, for the accommodation of the connecting-bolt 7.

Figure 4:
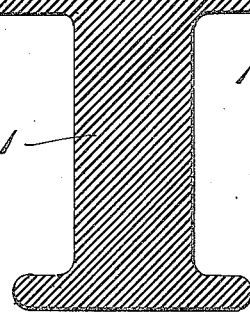
Fig. 4 is a horizontal sectional view through the center bolt connecting the spring-leaves, a fragmentary view of one of the leaves being shown in connection therewith.
Figure 5:
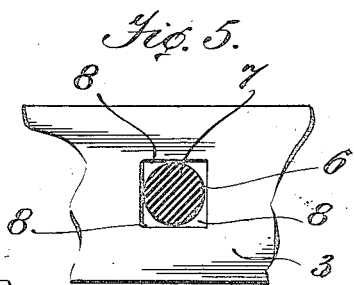
Fig. 5 is a similar view showing a modified arrangement and form of bolt.

For purposes hereinafter apparent, it is desirable that the holes 6 and the bolt 7 be at variance in cross-section; that is to say, if the bolt-hole is circular, (as shown in Figs. 2 and 4), the bolt should be polygonal—preferably rectangular in cross-section, or, on the other hand, if the holes 6, are rectangular or polygonal (as shown in Fig. 5), the bolt should be cylindrical. The object therefore of forming the holes 6 and the bolt 7 at what I term "at variance" is to produce alongside the bolt, or between it and the hole 6, a plurality of transverse lubricating ducts, which, as will be apparent, are disposed transversely to and communicate with the grooves 5 heretofore mentioned. These ducts I have indicated as 8.

Figure 3:
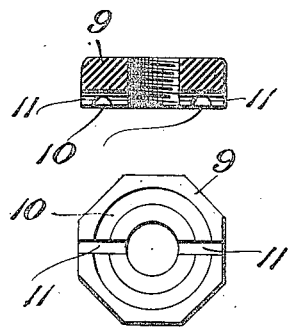

This form of bolt, it will be understood, is substituted for the usually employed tie-bolt. In this instance also the bolt is inserted reversely to what is usual—that is, head down, leaving the nut 9 to be applied at the upper instead of the lower end of the bolt. Moreover the nut is of peculiar construction, the idea being to provide the nut with orifices leading to the aforesaid transverse ducts 8. To accomplish this the nut may be variously formed but I prefer to provide in the underside of the nut an annular groove 10, and one or more communicating radial grooves 11 (see details Fig. 3).

Any desired means may be employed for containing the lubricant and feeding it to the ducts 9, but I prefer, for convenience of storage and operation, to form a lubricant reservoir in connection with the usually and necessarily employed clip-saddle.

In the present instance the clip-saddle 12 is provided in its underside with a cavity or chamber 13 designed to contain the lubricant. An opening 14 may be formed in one wall of the saddle and connected therewith may be an ordinary compression grease-cup 15, from which, as will be seen, grease may be fed into the reservoir 13, and from thence through the orifices of the nut to the transverse ducts 8 and to the grooves 5 of the leaves, thus being spread laterally between the rubbing-surfaces of the leaves.

At each side or near each end of the clip-saddle, seats 16 are formed for the accommodation of the usual clips 17, the terminals of which, as shown by dotted lines Fig. 2, embrace the sides of the spring and pass through and beyond the spring-seats 2 of the axle, where they are provided with the usual binding-nuts 18.

It will, of course, be understood that the clip-saddle may be given any desired external configuration or design; and also, that any means may be employed for introducing lubricant into the reservoir 13, the compression-cup merely being preferred.

Certain novel features of construction herein shown and described but not claimed, form the subject-matter of a companion application (filed Dec. 2, 1915 Serial Number 64,631.)

Having described my invention, what I claim, is:

1. The combination with the leaves of a vehicle-spring, provided with alining transverse holes, and intermediate lubricant-conductors for the leaves, of a transverse bolt located in the holes of the leaves for connecting the latter, said bolt being at variance in cross-section with said holes and combining with the walls of the same to form transverse lubricating-ducts leading to the intermediate lubricant-conductors, a clip-saddle mounted on the leaves and having its underside formed with a lubricant-reservoir receiving the upper end of the bolt and communicating with the lubricating-ducts thereof, and inverted U-shaped clips mounted on the saddle and embracing said leaves.

2. The combination with the leaves of a vehicle-spring, provided with a transverse hole and with longitudinal lubricating grooves in their upper faces, of a bolt located in the holes of the leaves and at variance in cross-section with the holes, whereby to provide lubricating ducts communicating with the grooves, a clip-saddle mounted on the leaves and provided in its underside with a lubricant reservoir receiving the upper end of the bolt, clips mounted on the saddle and embracing the leaves, and a perforated nut on the upper end of the bolt.

3. The combination with the leaves of a vehicle-spring, provided with a transverse hole and with longitudinal lubricating grooves in their upper faces, of a bolt located in the holes of the leaves and at variance in cross-section with the holes, whereby to provide lubricating ducts communicating with the grooves, a clip-saddle mounted on the leaves and provided in its underside with a lubricant reservoir receiving the upper end of the bolt, clips mounted on the saddle and embracing the leaves and a nut mounted on the upper end of the bolt within the reservoir and provided with orifices leading to the ducts.

In testimony whereof I have signed my name to this specification in the presence of two subscribing witnesses.

JOHN EMIL ANDERSON.

Witnesses:
 FRANK J. SENG,
 GEO. F. HASSEL.